(12) United States Patent
Ochitani et al.

(10) Patent No.: US 9,065,315 B1
(45) Date of Patent: Jun. 23, 2015

(54) MOTOR AND DISK DRIVE APPARATUS

(71) Applicant: Nidec Corporation, Kyoto (JP)

(72) Inventors: Shunichi Ochitani, Kyoto (JP); Wataru Yamauchi, Kyoto (JP); Masayuki Maeda, Kyoto (JP)

(73) Assignee: Nidec Corporation, Kyoto (JP)

( * ) Notice: Subject to any disclaimer, the term of this patent is extended or adjusted under 35 U.S.C. 154(b) by 0 days.

(21) Appl. No.: 14/570,121

(22) Filed: Dec. 15, 2014

(30) Foreign Application Priority Data

Jan. 24, 2014 (JP) .................................. 2014-010879

(51) Int. Cl.
| | |
|---|---|
| H02K 1/30 | (2006.01) |
| H02K 1/27 | (2006.01) |
| H02K 7/08 | (2006.01) |
| G11B 19/20 | (2006.01) |

(52) U.S. Cl.
CPC ................ *H02K 1/30* (2013.01); *H02K 1/2786* (2013.01); *H02K 7/086* (2013.01); *G11B 19/2009* (2013.01)

(58) Field of Classification Search
CPC ........... G11B 19/2009; G11B 19/2036; G11B 25/043; G11B 19/2045; G11B 19/2018
USPC ...................................................... 360/99.08
See application file for complete search history.

(56) References Cited

U.S. PATENT DOCUMENTS

| | | | | |
|---|---|---|---|---|
| 8,587,895 | B1 * | 11/2013 | Sumiji et al. ............... | 360/99.08 |
| 8,724,257 | B2 * | 5/2014 | Sekii et al. ................ | 360/99.08 |
| 8,810,096 | B2 * | 8/2014 | Mizukami et al. ............. | 310/90 |
| 8,867,165 | B2 * | 10/2014 | Isono ......................... | 360/99.08 |
| 8,922,943 | B2 * | 12/2014 | Yamada et al. ............ | 360/99.08 |
| 2010/0226046 | A1 | 9/2010 | Saito et al. | |

FOREIGN PATENT DOCUMENTS

| | | |
|---|---|---|
| JP | 2006-331558 A | 12/2006 |
| JP | 2010-205378 A | 9/2010 |
| JP | 2011-024351 A | 2/2011 |
| JP | 2011-114896 A | 6/2011 |
| JP | 2013-042636 A | 2/2013 |

* cited by examiner

Primary Examiner — Mark Blouin
(74) Attorney, Agent, or Firm — Keating & Bennett, LLP

(57) ABSTRACT

A rotating portion of a motor includes a magnet, a yoke including a yoke cylindrical portion, and a hub including a hub cylindrical portion. A first radial gap, which is a radial gap between the magnet and the yoke cylindrical portion, is filled with an adhesive from an upper axial end to an axial middle portion thereof, and includes a tapered gap gradually increasing in radial width with decreasing height. An upper axial end of the tapered gap is located above the axial middle portion of the first radial gap. In addition, no adhesive is provided from a lower axial end to an axial middle portion of a second radial gap, which is a radial gap between the yoke cylindrical portion and the hub cylindrical portion.

18 Claims, 12 Drawing Sheets

MOTOR AND DISK DRIVE APPARATUS

BACKGROUND OF THE INVENTION

1. Field of the Invention

The present invention relates to a motor and a disk drive apparatus.

2. Description of the Related Art

Spindle motors arranged to rotate disks are installed in hard disk apparatuses and optical disk apparatuses. Such spindle motors include a stationary portion fixed to a housing of an apparatus, and a rotating portion configured to rotate while supporting a disk. The spindle motor is configured to rotate the rotating portion with respect to the stationary portion by producing a torque through magnetic flux generated between a stator and a magnet. A known spindle motor is described, for example, in JP-A 2006-331558.

A rotating portion of the spindle motor described in JP-A 2006-331558 includes a rotor hub on which a disk is mounted, a rotor yoke, and a magnet. The rotor hub and the rotor yoke are fixed to each other through adhesion or the like. In addition, the rotor yoke and the magnet are also fixed to each other through adhesion or the like (see paragraph[0030] of JP-A 2006-331558).

If various portions of the rotating portion of the spindle motor are not securely fixed, the rigidity of the rotating portion is reduced to increase vibration of the rotating portion. An increase in the vibration of the rotating portion may lead to an error in reading and writing from or to the disk.

Meanwhile, if the rotor hub and the rotor yoke are fixed to each other over a large area through an adhesive, curing of the adhesive may easily cause a deformation of the rotor hub. The deformation of the rotor hub may also lead to an error in reading and writing from or to the disk.

SUMMARY OF THE INVENTION

A motor according to a preferred embodiment of the present invention includes a stationary portion and a rotating portion. The stationary portion includes an armature. The rotating portion is rotatable about a central axis extending in a vertical direction. The rotating portion includes a magnet, a yoke, and a hub. The magnet is cylindrical or substantially cylindrical, and includes a pole surface positioned radially opposite to the armature. The yoke includes a yoke cylindrical portion positioned radially outside of the magnet. The hub includes a hub cylindrical portion positioned radially outside of the yoke, and an annular disk mount portion extending radially outward from an outer circumference of the hub cylindrical portion. A first radial gap has a greater radial width at a lower end thereof than at an upper end thereof, the first radial gap being a radial gap between an outer circumferential surface of the magnet and an inner circumferential surface of the yoke cylindrical portion. A second radial gap has a greater radial width at a lower axial end thereof than at an upper axial end thereof, the second radial gap being a radial gap between an outer circumferential surface of the yoke cylindrical portion and an inner circumferential surface of the hub cylindrical portion. The first radial gap includes a tapered gap gradually increasing in radial width with decreasing height from an upper end thereof. The upper end of the tapered gap is located above an axial middle of the first radial gap. The first radial gap is filled with an adhesive from at least the upper end to the axial middle thereof. No adhesive is arranged from at least the lower axial end to an axial middle portion of the second radial gap.

According to the above preferred embodiment of the present invention, it is possible to provide the adhesive over a wide area in the first radial gap. This improves the rigidity of the magnet and the yoke as a whole. As a result, the vibration of the motor is reduced. Meanwhile, no adhesive is located in at least a lower half of the second radial gap. This contributes to reducing a deformation of the hub due to the adhesive.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Hereinafter, preferred embodiments of the present invention will be described with reference to the accompanying drawings. It is assumed herein that a direction parallel or substantially parallel to a central axis of a motor is referred to by the term "axial direction", "axial", or "axially", that directions perpendicular or substantially perpendicular to the central axis of the motor are referred to by the term "radial direction", "radial", or "radially", and that a direction along a circle centered on the central axis of the motor is referred to by the term "circumferential direction", "circumferential", or "circumferentially". It is also assumed herein that an axial direction is a vertical direction, and that a side on which a top cover is arranged with respect to a base plate is defined as an upper side. The shape of each member or portion and relative positions of different members or portions will be described based on the above assumptions. It should be noted, however, that the above definitions of the vertical direction and the upper and lower sides are not meant to restrict in any way the orientation of a motor or a disk drive apparatus according to any preferred embodiment of the present invention when in use.

Figure 1:
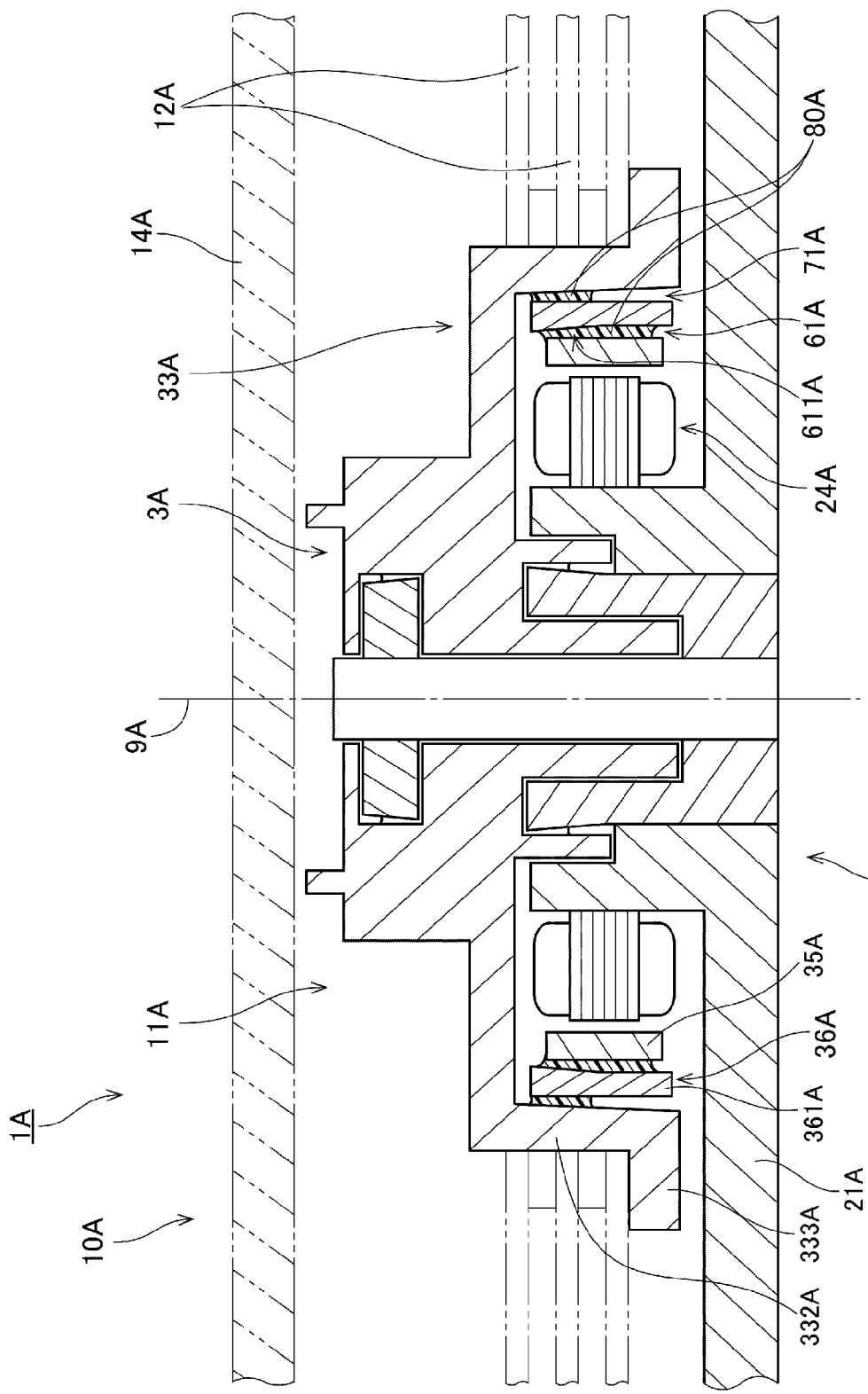
FIG. 1 is a vertical cross-sectional view of a motor according to a first preferred embodiment of the present invention.

FIG. 1 is a vertical cross-sectional view of a motor 11A according to a first preferred embodiment of the present invention. The motor 11A is preferably used in a disk drive apparatus 1A, for example. The disk drive apparatus 1A is configured to rotate disks 12A inside a housing 10A defined by a base plate 21A and a top cover 14A configured to cover an upper side of the base plate 21A. Each disk 12A includes a circular or substantially circular hole at a center thereof. Referring to FIG. 1, the motor 11A includes a stationary portion 2A and a rotating portion 3A configured to be rotatable about a central axis 9A extending in the vertical direction.

The stationary portion 2A preferably includes an armature 24A. The rotating portion 3A preferably includes a hub 33A, a magnet 35A, and a yoke 36A. The hub 33A includes a hub cylindrical portion 332A positioned radially outside of the yoke 36A, and an annular disk mount portion 333A extending radially outward from an outer circumference of the hub cylindrical portion 332A. The magnet 35A is cylindrical or substantially cylindrical. The magnet 35A includes a pole surface positioned radially opposite to the armature 24A. The yoke 36A includes a yoke cylindrical portion 361A positioned radially outside of the magnet 35A.

Here, a radial gap between an outer circumferential surface of the magnet 35A and an inner circumferential surface of the yoke cylindrical portion 361A will be referred to as a first radial gap 61A. The first radial gap 61A is preferably filled with an adhesive 80A at least from an upper axial end to an axial middle portion thereof.

The first radial gap 61A preferably has a greater radial width at a lower axial end thereof than at the upper axial end thereof. In addition, the first radial gap 61A includes a tapered gap 611A. The tapered gap 611A includes a gradually increasing radial width with decreasing height from an upper axial end thereof. In addition, the upper axial end of the tapered gap 611A is located above the axial middle portion of the first radial gap 61A.

When the magnet 35A and the yoke 36A are fixed to each other, the magnet 35A is preferably inserted inside the yoke 36A from below the yoke 36A with the adhesive 80A applied on the yoke 36A. Because the tapered gap 611A is included in the first radial gap 61A, when the magnet 35A is inserted inside the yoke 36A, the adhesive 80A is easily spread from a vicinity of a lower axial end portion of the tapered gap 611A to a vicinity of an upper axial end portion of the tapered gap 611A through capillary action. That is, the tapered gap 611A included in the first radial gap 61A enables at least an upper half of the first radial gap 61A to be filled with the adhesive 80A.

The magnet 35A and the yoke 36A are securely fixed to each other as a result of a wide area in the first radial gap 61A being filled with the adhesive 80A as described above. As a result, rigidity of the magnet 35A and the yoke 36A as a whole is improved to reduce vibration of the motor 11A.

Meanwhile, a radial gap between an outer circumferential surface of the yoke cylindrical portion 361A and an inner circumferential surface of the hub cylindrical portion 332A will be referred to as a second radial gap 71A. The second radial gap 71A preferably has a greater radial width at a lower axial end thereof than at an upper axial end thereof. In addition, no adhesive 80A is arranged from at least the lower axial end to an axial middle portion of the second radial gap 71A.

The absence of the adhesive 80A from at least the lower axial end to the axial middle portion of the second radial gap 71A contributes to preventing a deformation of the hub 33A due to curing of the adhesive 80A from occurring in the disk mount portion 333A. Thus, the likelihood that an error in reading from any disk 12A will occur due to a deformation of the hub 33A is reduced.

Figure 2:
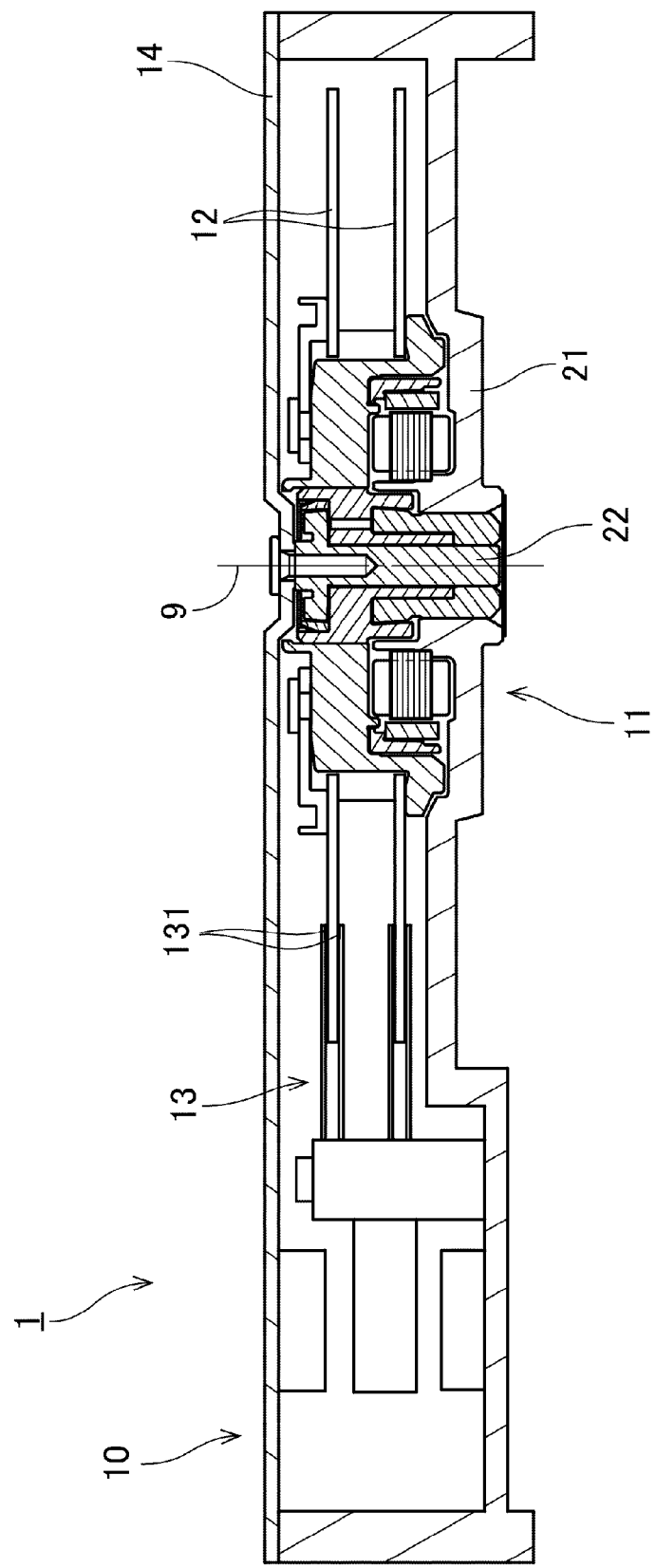
FIG. 2 is a vertical cross-sectional view of a disk drive apparatus according to a second preferred embodiment of the present invention.

FIG. 2 is a vertical cross-sectional view of a disk drive apparatus 1 in which a motor 11 according to a second preferred embodiment of the present invention is installed. The disk drive apparatus 1 is configured to rotate magnetic disks 12, each of which includes a circular hole at a center thereof, to perform reading and writing of information from or to the magnetic disks 12. Referring to FIG. 2, the disk drive apparatus 1 preferably includes the motor 11, the magnetic disks 12, an access portion 13, and a top cover 14. The number of magnetic disks 12 is preferably two, for example.

The motor 11 is configured to rotate the two magnetic disks 12 about a central axis 9 while supporting the magnetic disks 12. The motor 11 preferably includes a base plate 21 extending perpendicularly to the central axis 9. An upper side of the base plate 21 is covered with the top cover 14. A rotating portion 3 of the motor 11, the two magnetic disks 12, and the access portion 13 are accommodated inside a housing 10 defined by the base plate 21 and the top cover 14. The access portion 13 is configured to move heads 131 along recording surfaces of the magnetic disks 12 to perform the reading and writing of information from or to the magnetic disks 12.

Note that the number of magnetic disks 12 included in the disk drive apparatus 1 may alternatively be one or any desirable number more than two. Also note that the access portion 13 may alternatively be configured to perform only one of the reading and the writing of information from or to the magnetic disk(s) 12.

An interior space of the housing 10 is preferably a clean space with no, or only an extremely small amount of, dirt or dust. According to the present preferred embodiment, the interior space of the housing 10 is preferably filled with clean air. Note, however, that the interior space of the housing 10 may alternatively be filled with a helium gas, a hydrogen gas, a nitrogen gas, etc., instead of air. Also note that the interior space of the housing 10 may alternatively be filled with a mixture of any of these gases and air.

Figure 3:
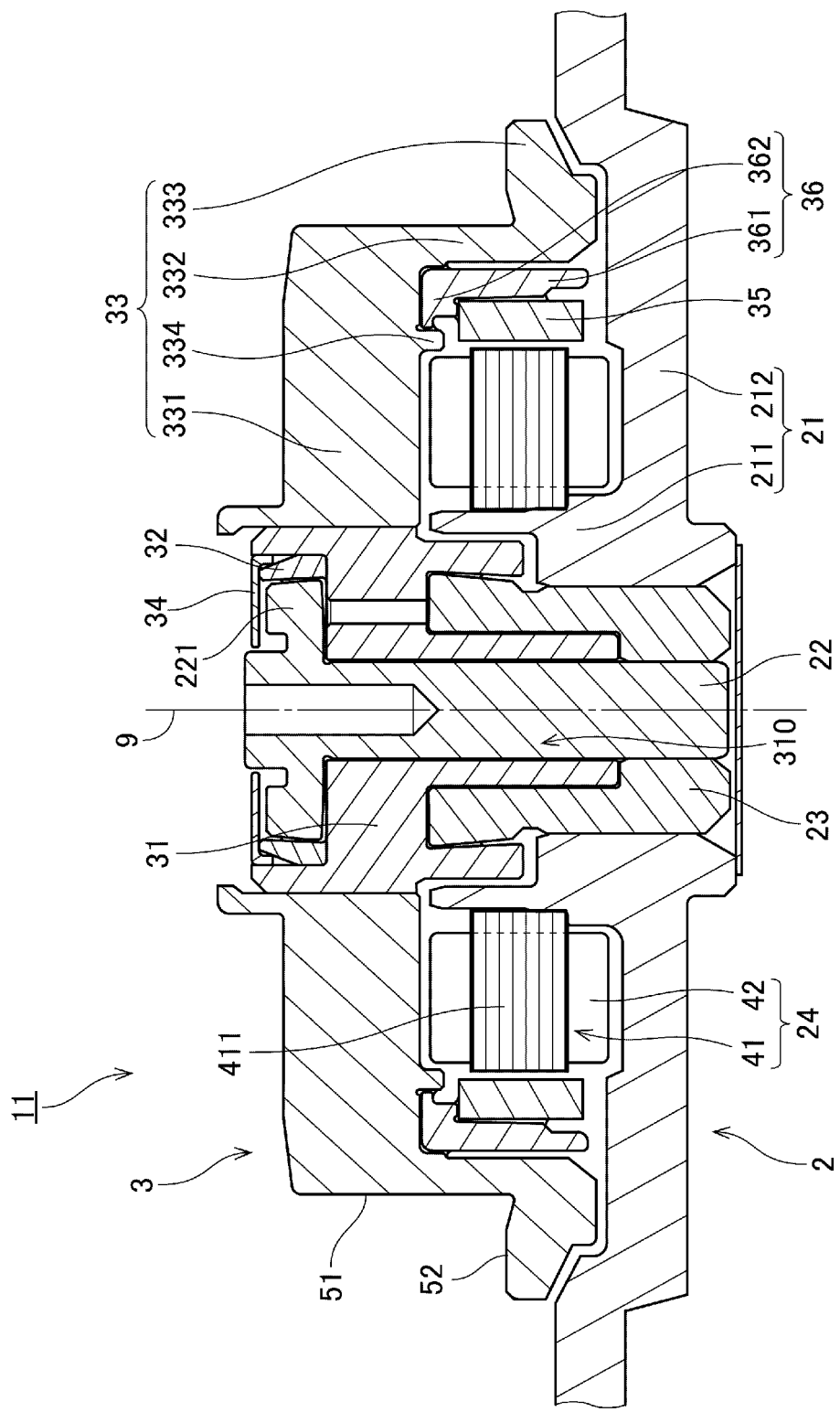
FIG. 3 is a vertical cross-sectional view of a motor according to the second preferred embodiment of the present invention.

Next, the structure of the motor 11 used in the disk drive apparatus 1 will now be described in more detail below. FIG. 3 is a vertical cross-sectional view of the motor 11. Referring to FIG. 3, the motor 11 includes a stationary portion and the rotating portion 3. The stationary portion 2 is stationary relative to the housing 10 of the disk drive apparatus 1. The rotating portion 3 is supported to be rotatable with respect to the stationary portion 2.

The stationary portion 2 according to the present preferred embodiment preferably includes the base plate 21, a shaft 22, a lower annular member 23, and a stator 24.

The base plate 21 extends perpendicularly or substantially perpendicularly to the central axis 9 below the stator 24, the rotating portion 3, the magnetic disks 12, and the access portion 13. A metal such as, for example, an aluminum alloy is preferably used as a material of the base plate 21. Referring to FIG. 3, the base plate 21 preferably includes a cylindrical holder portion 211 and a plate portion 212. The cylindrical holder portion 211 extends in the axial direction to assume a cylindrical or substantially cylindrical shape radially inside of the stator 24. The plate portion 212 extends radially outward from the cylindrical holder portion 211.

The shaft 22 is arranged along the central axis 9. A metal such as, for example, stainless steel is preferably used as a material of the shaft 22. Referring to FIG. 2, an upper axial end portion of the shaft 22 is preferably fixed to the top cover 14 of the disk drive apparatus 1. Meanwhile, referring to FIG. 3, a lower axial end portion of the shaft 22 is preferably fixed to the cylindrical holder portion 211 of the base plate 21 through the lower annular member 23.

Referring to FIG. 3, the shaft 22 preferably includes an upper annular portion 221. The upper annular portion 221 projects radially outward in the vicinity of the upper axial end portion of the shaft 22. The upper annular portion 221 is preferably located between a sleeve portion 31 and a cap 34. Each of the sleeve portion 31 and the cap 34 will be described below. The upper annular portion 221 according to the present preferred embodiment is preferably a portion of a single monolithic member that defines the shaft 22. Note, however, that the upper annular portion 221 and the shaft 22 may alternatively be defined by separate members.

The lower annular member 23 is located below the upper annular portion 221, and annularly surrounds the shaft 22. A metal such as, for example, copper or brass is preferably used as a material of the lower annular member 23. The lower annular member 23 is fixed to the shaft 22 through, for example, press fitting, shrink fitting, an adhesive, or the like. Note, however, that the shaft 22 and the lower annular member 23 may alternatively be defined by a single continuous monolithic member.

The stator 24 is preferably an armature including a stator core 41 and a plurality of coils 42. The stator core 41 is preferably, for example, defined by laminated steel sheets, that is, electromagnetic steel sheets, such as silicon steel sheets, stacked one upon another in the axial direction. The stator core 41 is fixed to an outer circumferential surface of the cylindrical holder portion 211. In addition, the stator core 41 includes a plurality of teeth 411 projecting radially outward. The coils 42 are a collection of conducting wires wound around the teeth 411. Both the teeth 411 and the coils 42 preferably have an annular or substantially annular shape with the central axis 9 as a center.

The rotating portion 3 according to the present preferred embodiment preferably includes a sleeve 31, an auxiliary sleeve member 32, a hub 33, the cap 34, a magnet 35, and a yoke 36.

The sleeve 31 extends in the axial direction to assume a tubular shape around the shaft 22. A metal such as, for example, stainless steel, an aluminum alloy, or copper is preferably used as a material of the sleeve 31. The sleeve 31 includes a central through hole 310 extending therethrough in the vertical direction. At least a portion of the shaft 22 is located in the central through hole 310.

The auxiliary sleeve member 32 is an annular member located between the upper annular portion 221 of the shaft 22 and an inner circumferential surface of the sleeve 31. An inner circumferential surface of the auxiliary sleeve member 32 and an outer circumferential surface of the upper annular portion 221 are preferably positioned radially opposite to each other with a gap intervening therebetween.

A lubricating fluid is located between a combination of the shaft 22 and the lower annular member 23 and a combination of the sleeve 31 and the auxiliary sleeve member 32. A polyolester oil or a diester oil, for example, is preferably used as the lubricating fluid. The sleeve 31 and the auxiliary sleeve member 32 are supported through the lubricating fluid to be rotatable with respect to the shaft 22 and the lower annular member 23. That is, according to the present preferred embodiment, the shaft 22 and the lower annular member 23, which are components of the stationary portion 2, the sleeve 31 and the auxiliary sleeve member 32, which are components of the rotating portion 3, and the lubricating fluid arranged therebetween together define a fluid dynamic bearing. Note that the rotating portion 3 may alternatively be supported to be rotatable with respect to the stationary portion 2 by a bearing having another structure, such as, for example, a ball bearing, a plain bearing, etc.

The hub 33 is positioned radially outside of the sleeve 31. A metal that is not a ferromagnetic material, such as, for example, an aluminum alloy, is preferably used as a material of the hub 33. According to the present preferred embodiment, the sleeve 31 and the hub 33 are preferably defined by separate members. The sleeve 31 is inserted radially inside the hub 33, and is fixed to the hub 33. The hub 33 includes a hub upper plate portion 331, a hub cylindrical portion 332, a disk mount portion 333, and a projecting portion 334. The hub upper plate portion 331 extends in an annular shape above the stator 24. In addition, the hub upper plate portion 331 extends radially inward from an upper axial end of the hub cylindrical portion 332. The hub cylindrical portion 332 extends downward from a radially outer end portion of the hub upper plate portion 331 to assume a tubular shape. The hub cylindrical portion 332 is positioned radially outside of the yoke 36. The disk mount portion 333 projects radially outward from an outer circumference of the hub cylindrical portion 332. According to the present preferred embodiment, the disk mount portion 333 projects from a lower axial end portion of the hub cylindrical portion 332. The projecting portion 334 projects downward from an axially lower surface of the hub upper plate portion 331 to assume an annular or substantially annular shape.

According to the present preferred embodiment, a cylindrical outer circumferential surface of the hub cylindrical portion 332 is fitted in the circular hole of each magnetic disk 12. That is, the outer circumferential surface of the hub cylindrical portion 332 is a disk support surface 51. An inner circumferential portion of each magnetic disk 12 contacts at least a portion of the disk support surface 51. Thus, each magnetic disk 12 is radially positioned.

A lower surface of a lower one of the magnetic disks 12 contacts at least a portion of an upper surface of the disk mount portion 333, which is annular in shape. That is, the upper surface of the disk mount portion 333 is a disk mount surface 52. The disk mount surface 52 extends radially outward from the outer circumferential surface of the hub cylindrical portion 332. Thus, the magnetic disks 12 are axially positioned. The two magnetic disks 12 are thus supported by the disk support surface 51 and the disk mount surface 52.

The cap 34 is preferably a disk-shaped or substantially disk-shaped member including a circular hole in a center thereof. A material of the cap 34 may be either a metal or a resin. The cap 34 covers an upper side of the gap between the auxiliary sleeve member 32 and the upper annular portion 221. This contributes to preventing the lubricating fluid of the fluid dynamic bearing from evaporating. In addition, an outer circumferential surface of the cap 34 is preferably fixed to the inner circumferential surface of the sleeve 31 through, for example, an adhesive. Once the sleeve 31 starts rotating, the cap 34 also starts rotating together with the sleeve 31.

According to the present preferred embodiment, the sleeve 31, the auxiliary sleeve member 32, the hub 33, and the cap 34 are preferably defined by four separate members, for example. Note, however, that any two or more of the four members may be defined by a single monolithic member. For example, the sleeve 31 and the auxiliary sleeve member 32 may be defined by a single monolithic member. Also, the sleeve 31 and the hub 33 may be defined by a single monolithic member.

The magnet 35 is cylindrical or substantially cylindrical in shape, and is positioned radially outside of the stator 24. An inner circumferential surface of the magnet 35 includes north and south poles which alternate with each other in a circumferential direction. In addition, the inner circumferential surface of the magnet 35 is positioned radially opposite to a radially outer end surface of each of the teeth 411 with a slight gap intervening therebetween. That is, the magnet 35 includes a pole surface positioned radially opposite to the stator 24.

The yoke 36 is a member which intervenes between the hub 33 and the magnet 35. The yoke 36 is preferably made of a metal that is a ferromagnetic material, for example. The yoke 36 covers at least a portion of an outer circumferential surface of the magnet 35. This contributes to preventing a magnetic force from leaking through the outer circumferential surface of the magnet 35, that is, this contributes to preventing a reduction in a torque of the motor 11.

The yoke 36 according to the present preferred embodiment preferably includes a yoke cylindrical portion 361 and a yoke upper plate portion 362. The yoke cylindrical portion 361 is a cylindrical or substantially cylindrical portion positioned radially outside of the magnet 35 and extending along the central axis 9. The yoke upper plate portion 362 extends radially inward from an upper axial end of the yoke cylindrical portion 361.

Once electric drive current is supplied to the coils 42 in the motor 11 described above, magnetic flux is generated around each of the teeth 411. Then, interaction between the magnetic flux of the teeth 411 and magnetic flux of the magnet produces a circumferential torque between the stationary portion 2 and the rotating portion 3, so that the rotating portion 3 is caused to rotate about the central axis 9 with respect to the stationary portion 2. The magnetic disks 12 supported by the hub 33 are caused to rotate about the central axis 9 together with the rotating portion 3.

Figure 4:
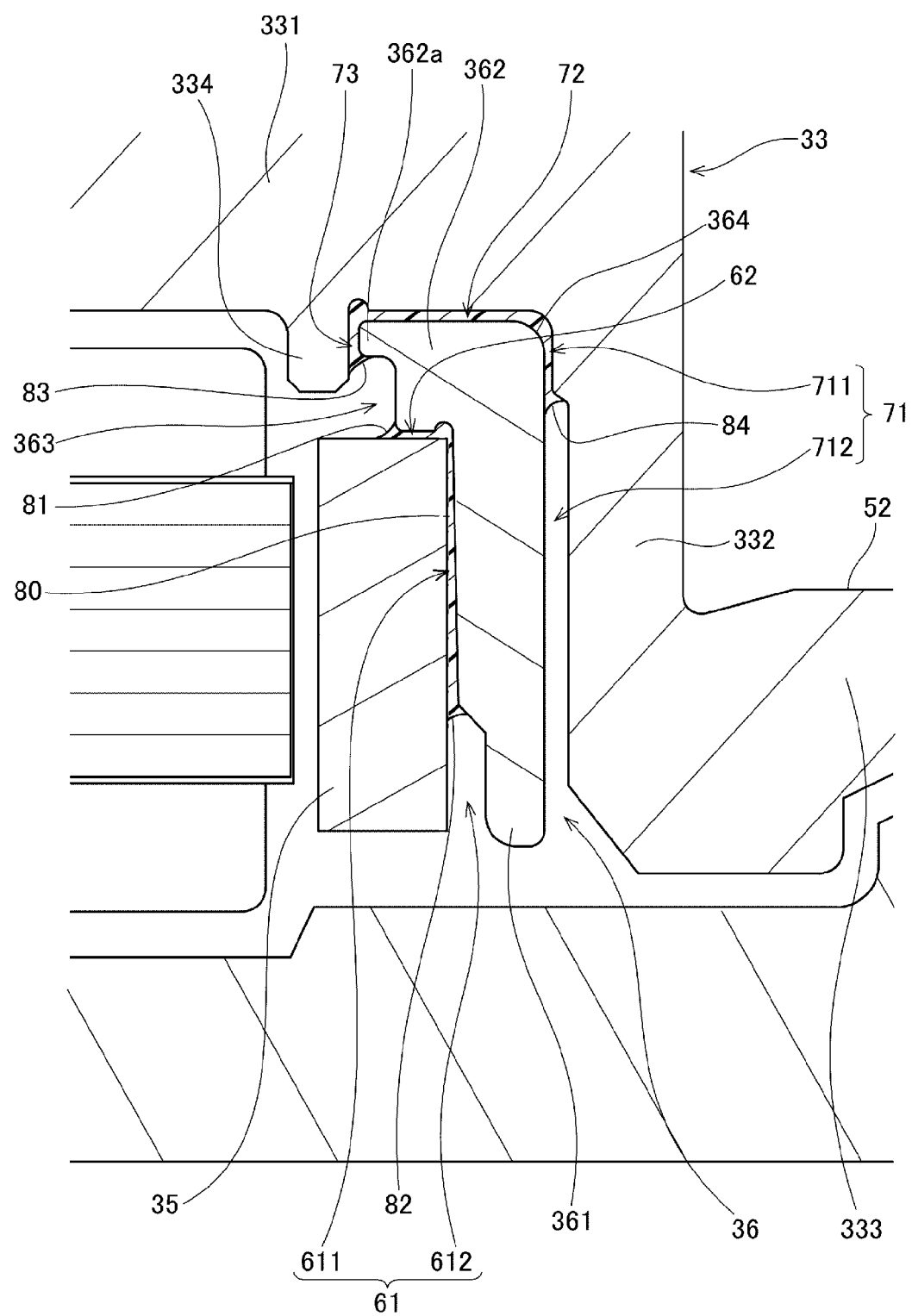
FIG. 4 is a partial vertical cross-sectional view of the motor according to the second preferred embodiment of the present invention.

Next, a condition in which each of the magnet 35, the yoke 36, and the hub 33 is fixed will now be described below. FIG. 4 is a partial vertical cross-sectional view of the motor 11. Referring to FIG. 4, the hub 33 and the yoke 36 are preferably fixed to each other through an adhesive 80, and the magnet 35 and the yoke 36 are also preferably fixed to each other through the adhesive 80. According to the present preferred embodiment, the yoke 36 is, for example, press fitted radially inside of the hub 33, and, in addition, the hub 33 and the yoke 36 are fixed to each other through the adhesive 80. Meanwhile, the magnet 35 and the yoke 36 are preferably fixed to each other through only the adhesive 80.

Here, a radial gap between the outer circumferential surface of the magnet 35 and an inner circumferential surface of the yoke cylindrical portion 361 is referred to as a first radial gap 61, and an axial gap between an upper surface of the magnet 35 and the yoke upper plate portion 362 is referred to as a first axial gap 62. An upper axial end of the first radial gap 61 and a radially outer end of the first axial gap 62 are joined to each other.

The first radial gap 61 preferably includes a tapered gap 611 and an increased width portion 612. According to the present preferred embodiment, an upper axial end of the tapered gap 611 corresponds to the upper axial end of the first radial gap 61. The tapered gap 611 is gradually increasing in radial width with decreasing height from the upper axial end thereof. In addition, a lower axial end of the tapered gap 611 is located below an axial middle portion of the first radial gap 61. The increased width portion 612 is located below the tapered gap 611. The increased width portion 612 has a radial width greater than a maximum radial width of the tapered gap 611, that is, the radial width of the lower axial end of the tapered gap 611. Therefore, the first radial gap 61 has a greater radial width at a lower axial end thereof than at the upper axial end thereof.

According to the present preferred embodiment, a portion of the inner circumferential surface of the yoke cylindrical portion 361 which defines the increased width portion 612 is recessed radially outward relative to a portion of the inner circumferential surface of the yoke cylindrical portion 361 which defines the tapered gap 611. That is, out of the outer circumferential surface of the magnet 35 and the inner circumferential surface of the yoke cylindrical portion 361 which together define the increased width portion 612, the inner circumferential surface of the yoke cylindrical portion 361 is provided with a recessed portion. Thus, an increased radial width of the increased width portion 612 is secured without reducing the volume of the magnet 35. Accordingly, deterioration in a magnetic property of the magnet 35 is prevented.

The adhesive 80 is located in each of the first radial gap 61 and the first axial gap 62. Specifically, referring to FIG. 4, both of the first axial gap 62 and the tapered gap 611 of the first radial gap 61 is filled with the adhesive 80. Thus, an upper surface 81 of the adhesive 80 located between the magnet 35 and the yoke 36 is located in the vicinity of a radially inner end of the first axial gap 62. That is, the upper surface 81 of the adhesive 80 is located above the upper surface of the magnet 35. Thus, the magnet 35 and the yoke 36 are both radially and axially fixed to each other as a result of the adhesive 80 being arranged not only in the first radial gap 61 but also in the first axial gap 62. Accordingly, an increase in strength with which the magnet 35 and the yoke 36 are fixed to each other is achieved.

Meanwhile, a lower surface 82 of the adhesive 80 between the magnet 35 and the yoke 36 is located in the increased width portion 612. Therefore, the first radial gap 61 is preferably filled with the adhesive 80 from the upper axial end thereof to the lower surface 82, which is located below the axial middle portion of the first radial gap 61. That is, at least an upper half of the first radial gap 61 is filled with the adhesive 80.

Further, according to the present preferred embodiment, the lower surface 82 of the adhesive 80 is located at an axial level lower than an axial level of an outer surface 84, which will be described below, and that of the disk mount surface 52 of the disk mount portion 333. Accordingly, the magnet 35 and the yoke 36 are preferably fixed to each other at an axial level lower than axial levels of the two magnetic disks 12 (see FIG. 2). The magnet 35 and the yoke 36 are securely fixed to each other as a result of the adhesive 80 being arranged over a wide area in the first radial gap 61 as described above. As a result, the rigidity of the magnet 35 and the yoke 36 as a whole is improved to reduce vibration of the motor 11.

A radial gap between an outer circumferential surface of the yoke cylindrical portion 361 and an inner circumferential surface of the hub cylindrical portion 332 will be referred to as a second radial gap 71. In addition, an axial gap between an upper surface of the yoke upper plate portion 362 and the lower surface of the hub upper plate portion 331 will be referred to as a second axial gap 72. An upper axial end of the second radial gap 71 and a radially outer end of the second axial gap 72 are joined to each other.

Here, the yoke upper plate portion 362 preferably includes a yoke upper plate projecting portion 362a projecting radially inward from an inner circumferential surface thereof. The yoke upper plate portion 362 includes, below the yoke upper plate projecting portion 362a, an annular groove portion 363 recessed radially outward relative to a lower axial end of the yoke upper plate projecting portion 362a. A radial gap between an inner circumferential surface of the yoke upper plate projecting portion 362a and an outer circumferential surface of the projecting portion 334 of the hub 33 will be hereinafter referred to as a third radial gap 73. An upper axial end of the third radial gap 73 and a radially inner end of the second axial gap 72 are joined to each other.

The second radial gap 71 preferably includes an upper gap 711 and a lower gap 712. An upper axial end of the upper gap 711 corresponds to the upper axial end of the second radial gap 71. That is, the upper gap 711 is arranged at a top of the second radial gap 71. The yoke 36 includes a corner portion 364 at a junction of an upper axial end surface and an outer circumferential surface of the yoke 36. The corner portion 364 is preferably a curved chamfered surface. It is assumed that the axial position of the upper axial end of the second radial gap 71, that is, the upper axial end of the upper gap 711, coincides with the axial position of a lower axial end of the corner portion 364. An upper axial end of the lower gap 712 is joined to a lower axial end of the upper gap 711. Note that the corner portion 364 may alternatively be an inclined surface extending obliquely radially outward and downward.

According to the present preferred embodiment, the upper gap 711 preferably has a uniform or substantially uniform radial width from the upper axial end to the lower axial end thereof. Meanwhile, the lower gap 712 preferably has a uniform or substantially uniform radial width except in the vicinity of the upper axial end thereof and in the vicinity of a lower axial end thereof. A maximum radial width of the lower gap 712 is greater than a maximum radial width of the upper gap 711. In addition, the second radial gap 71 preferably has a greater radial width at a lower axial end thereof than at the upper axial end thereof.

The adhesive 80 is located in each of the second radial gap 71, the second axial gap 72, and the third radial gap 73. Specifically, referring to FIG. 4, each of the upper gap 711 of the second radial gap 71, the second axial gap 72, and the third radial gap 73 is filled with the adhesive 80. Accordingly, an inner surface 83, i.e., a radially inner surface, of the adhesive 80 located between the hub 33 and the yoke 36 is preferably located below the third radial gap 73.

The outer surface 84, which is a radially outer surface of the adhesive 80 located between the hub 33 and the yoke 36, is located in the lower gap 712 of the second radial gap 71. In addition, the outer surface 84 is located above an axial middle portion of the second radial gap 71. That is, preferably no adhesive 80 is arranged from the lower axial end of the second radial gap 71 to the axial middle portion of the second radial gap 71. Note that, according to the present preferred embodiment, the outer surface 84 is a lower surface of the adhesive 80 provided in the second radial gap 71.

When the hub 33 and the yoke 36 are fixed to each other through the adhesive 80, curing of the adhesive 80 may easily cause a deformation of the hub 33. According to the present preferred embodiment, no adhesive 80 is located in at least a lower half of the second radial gap 71, while a portion of the second radial gap 71 in the vicinity of the upper axial end thereof is filled with the adhesive 80. This contributes to preventing the curing of the adhesive 80 from causing a deformation of the hub cylindrical portion 332. This in turn contributes to preventing a displacement of the disk mount portion 333, which is defined continuously with the hub cylindrical portion 332. That is, the likelihood that an error in reading from any magnetic disk 12 will occur due to the deformation of the hub 33 because of the adhesive 80 is reduced.

In particular, according to the present preferred embodiment, the outer surface 84 is located at an axial level higher than an axial level of the disk mount portion 333. This contributes to effectively preventing a displacement of the disk mount portion 333 due to the curing of the adhesive 80 located between the hub 33 and the yoke 36. Further, the outer surface 84 is located at an axial level higher than an axial level of an upper axial end of the magnet 35. Because the adhesive 80 in the second radial gap 71 is provided in only a small area in the vicinity of the upper axial end of the second radial gap 71 as described above, the likelihood of a deformation of the hub cylindrical portion 332 is reduced while sufficient strength with which the hub 33 and the yoke 36 are fixed to each other is secured. Accordingly, the likelihood that an error in reading from any magnetic disk 12 will occur due to the deformation of the hub 33 because of the adhesive 80 is further reduced. Note that the outer surface 84 may alternatively be arranged at an axial level lower than an axial level of the upper axial end of the magnet 35.

Meanwhile, because the adhesive 80 is preferably located in the three gaps, the second radial gap 71, the second axial gap 72, and the third radial gap 73, the hub 33 and the yoke 36 are more securely fixed to each other than in the case where the adhesive 80 is arranged only in the second radial gap 71. In addition, according to the present preferred embodiment, the inner circumferential surface of the yoke upper plate projecting portion 362a and the outer circumferential surface of the projecting portion 334 are press fitted to each other. This contributes to more securely fixing the hub 33 and the yoke 36 to each other. Accordingly, the rigidity of the hub 33 and the yoke 36 as a whole is improved to reduce the vibration of the motor 11.

Further, the adhesive 80 is located in the upper gap 711, where the second radial gap 71 has a minimum radial width. Meanwhile, the adhesive 80 is also arranged at the upper axial end of the tapered gap 611, where the first radial gap 61 has a minimum radial width. In addition, the minimum radial width of the second radial gap 71 is greater than the minimum radial width of the first radial gap 61. That is, the amount of the adhesive 80 per unit adhesion area is greater in the upper gap 711, where adhesion is carried out within the second radial gap 71, than in the first radial gap 61. Accordingly, the hub 33 and the yoke 36 are more securely fixed to each other at the upper gap 711, where adhesion is carried out within the second radial gap 71.

The above-described structure enables the motor 11 according to the present preferred embodiment to have improved rigidity of the rotating portion 3 while reducing the likelihood of a deformation of the hub 33. Accordingly, vibration of the rotating portion 3 is significantly reduced or prevented, and further, the likelihood of a displacement of any magnetic disk is significantly reduced or prevented. That is, the likelihood that an error in reading from any magnetic disk 12 or an error in writing to any magnetic disk 12 will occur is significantly reduced or prevented.

Figure 5:
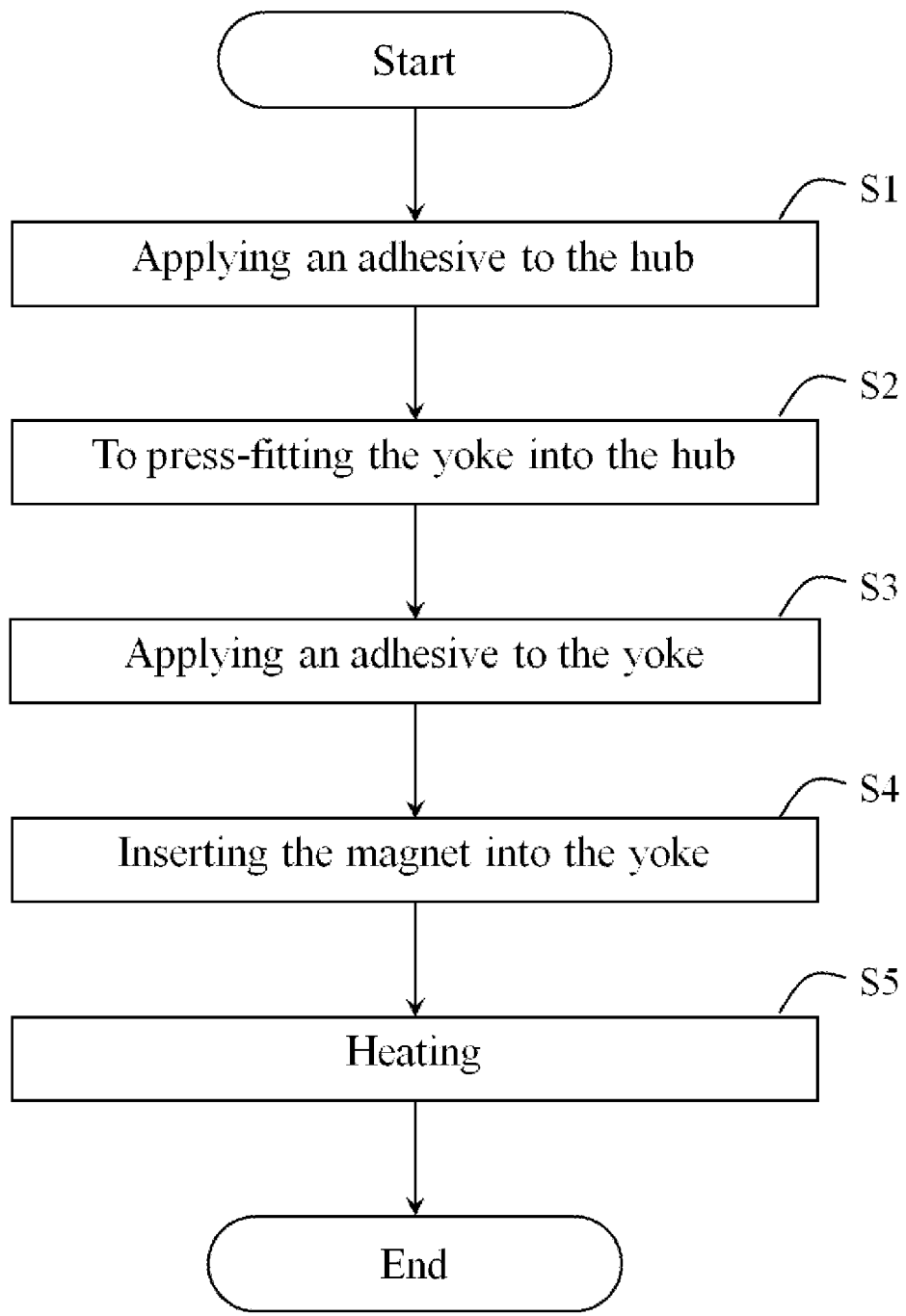
FIG. 5 is a flowchart illustrating a portion of a process of assembling a rotating portion according to the second preferred embodiment of the present invention.
Figure 6:
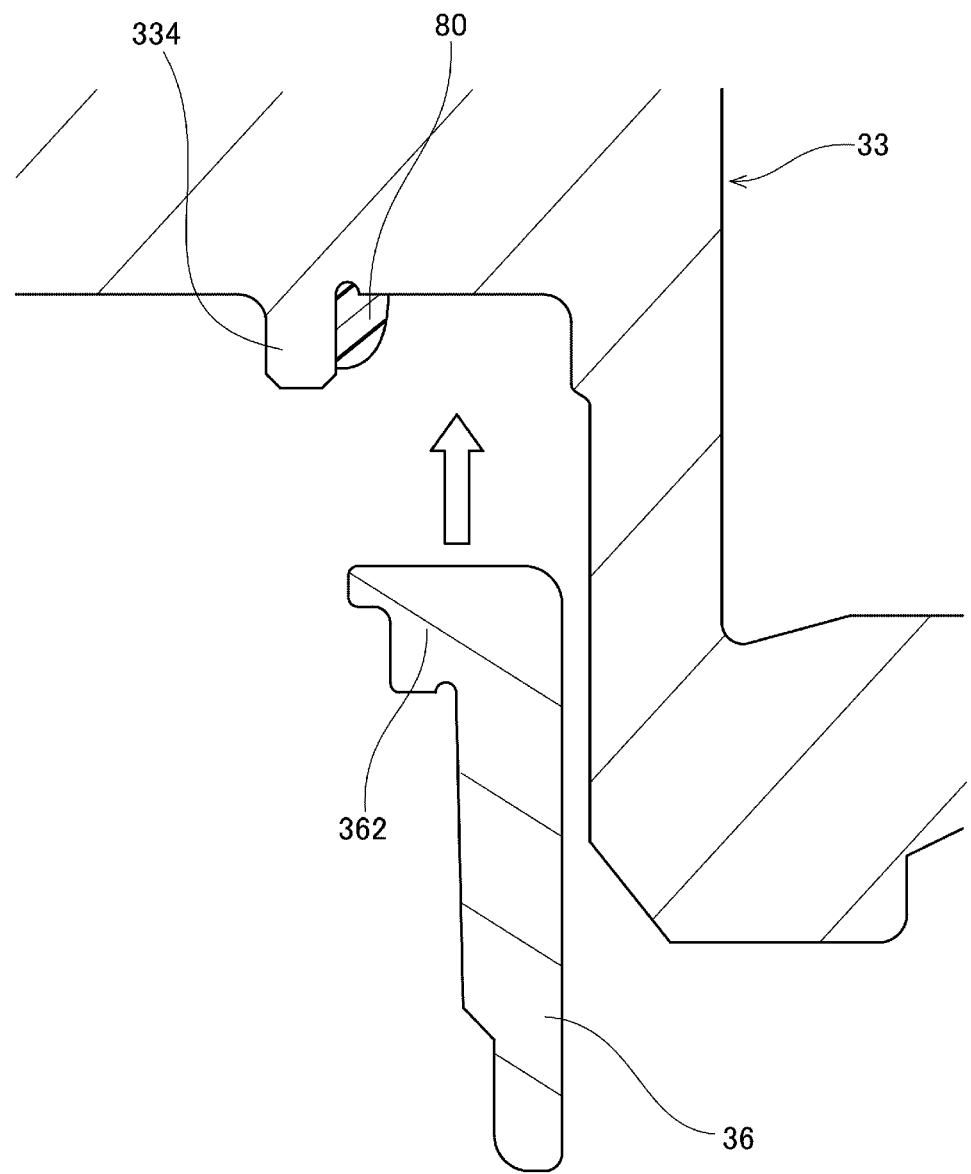
FIG. 6 is a diagram illustrating how the rotating portion is assembled according to the second preferred embodiment of the present invention.
Figure 7:
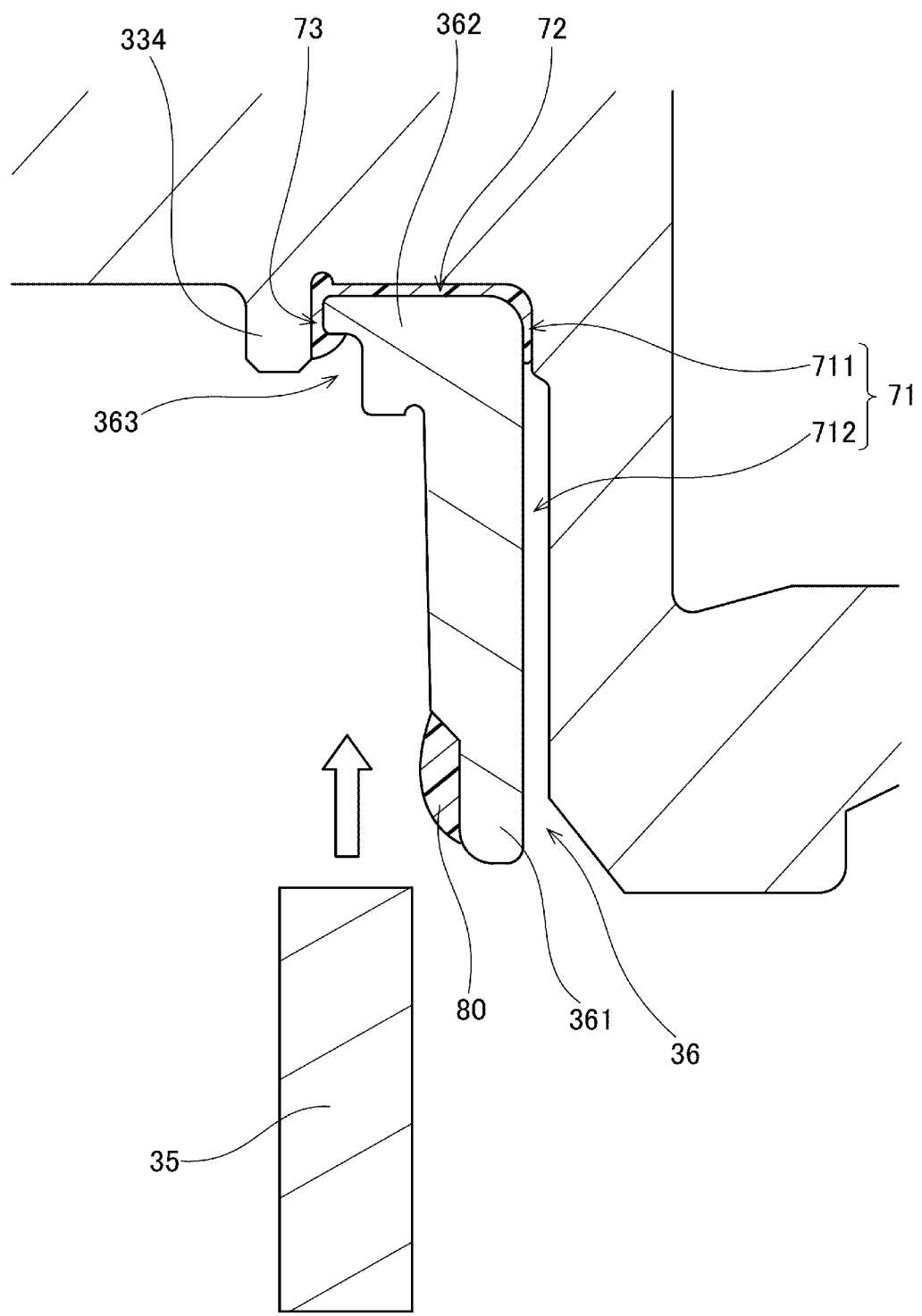
FIG. 7 is a diagram illustrating how the rotating portion is assembled according to the second preferred embodiment of the present invention.
Figure 8:
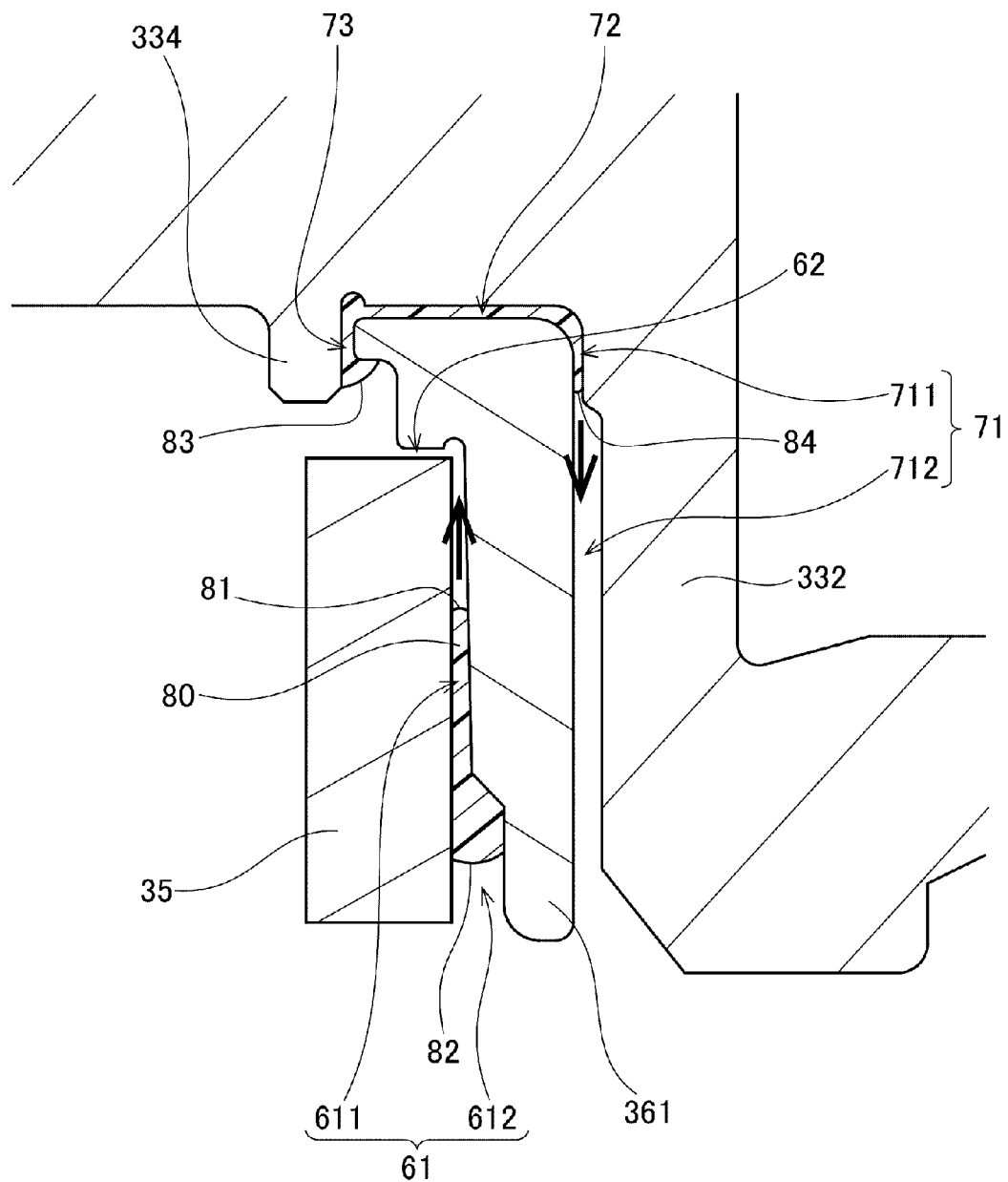
FIG. 8 is a diagram illustrating how the rotating portion is assembled according to the second preferred embodiment of the present invention.

Next, a procedure for assembling the magnet 35, the yoke 36, and the hub 33 in accordance with a preferred embodiment of the present invention will now be described below. FIG. 5 is a flowchart illustrating a portion of a preferred embodiment of a process of assembling the rotating portion 3. FIGS. 6, 7, and 8 are diagrams illustrating how the rotating portion 3 is assembled in accordance with a non-limiting example of a method of manufacturing according to a preferred embodiment of the present invention.

Referring to FIG. 5, first, the adhesive 80 is applied to the outer circumferential surface of the projecting portion 334 of the hub 33 (step S1). At this time, the amount of the adhesive 80 applied to the projecting portion 334 is preferably greater than the combined volume of the upper gap 711 of the second radial gap 71, the second axial gap 72, and the third radial gap 73.

According to the present preferred embodiment, a so-called thermosetting adhesive, such as, for example, an epoxy resin adhesive or a phenol resin adhesive, is preferably used as the adhesive 80. If the adhesive 80 is heated, the viscosity of the adhesive 80 is once reduced before the adhesive 80 is cured.

Next, referring to FIG. 6, the yoke 36 is press fitted to the hub 33 from below the hub 33 (step S2). At this time, as suggested above, the outer circumferential surface of the projecting portion 334 of the hub 33 and the inner circumferential surface of the yoke upper plate projecting portion 362a of the yoke 36 are press-fit surfaces. Referring to FIG. 7, once the yoke 36 is press fitted to the hub 33, the adhesive 80 applied to the projecting portion 334 at step S1 spreads from the third radial gap 73 into the second axial gap 72 and further into the second radial gap 71. Note that, at the stage of step S2, the adhesive 80 may not have reached the second radial gap 71 yet.

In addition, at this time, a portion of the adhesive 80 which has not spread radially outward from the second axial gap 72 may stay in the groove portion 363 of the yoke 36 as illustrated in FIG. 7. Provision of the groove portion 363 in the yoke 36 provides a space in which the adhesive 80 can stay temporarily.

Referring to FIG. 7, the adhesive 80 is thereafter applied to the portion of the inner circumferential surface of the yoke cylindrical portion 361 which defines the increased width portion 612 (step S3). At this time, the amount of the adhesive 80 applied to the yoke 36 is preferably greater than the combined volume of the tapered gap 611 of the first radial gap 61 and the first axial gap 62.

Then, the magnet 35 is inserted inside the yoke 36 from below the yoke 36 such that the magnet 35 is positioned radially inside of the yoke cylindrical portion 361 (step S4). At step S4, the adhesive 80 applied at step S3 makes contact with the outer circumferential surface of the magnet 35 while the magnet 35 is moved upward. Thus, the adhesive 80 spreads upward from a lower axial end portion of the tapered gap 611.

Finally, the hub 33, the magnet 35, and the yoke 36 are heated (step S5). As a result, the viscosity of the adhesive is once reduced. Once the viscosity of the adhesive 80 is reduced, the adhesive 80 spreads as indicated by arrows in FIG. 8 through capillary forces.

At step S4, the adhesive 80 located between the magnet and the yoke 36 is spread in the vicinity of a boundary between an upper axial end of the increased width portion 612 and the lower axial end of the tapered gap 611. Once the viscosity of the adhesive 80 is reduced at step S5, a capillary force which causes the adhesive 80 to travel from the lower axial end to the upper axial end of the tapered gap 611 is generated because the tapered gap 611 gradually decreases in radial width from the lower axial end to the upper axial end thereof. Because of this capillary force, the adhesive 80 enters further into the tapered gap 611. As a result, the adhesive 80 reaches the first axial gap 62. As described above, provision of the tapered gap 611 in the first radial gap 61 makes it easier for at least the upper half of the first radial gap 61, in which the tapered gap 611 is arranged, to be filled with the adhesive 80. As a result, the adhesive 80 is arranged over a wide area in the first radial gap 61, so that the magnet 35 and the yoke 36 are securely fixed to each other.

Here, the axial distance between the upper surface of the magnet 35 and a surface of the yoke upper plate portion 362 increases in a radially inward direction from a radially inner end of the first axial gap 62. This arrangement causes a capillary force which attracts the adhesive 80 radially outward to be generated in the vicinity of the radially inner end of the first axial gap 62. Accordingly, the upper surface 81 of the adhesive 80 is defined at the radially inner end of the first axial gap 62. Meanwhile, the radial distance between the outer circumferential surface of the magnet 35 and the inner circumferential surface of the yoke cylindrical portion 361 increases with decreasing height from the lower axial end of the tapered gap 611. This arrangement causes a capillary force which attracts the adhesive 80 upward to be generated in the vicinity of the lower axial end portion of the tapered gap 611. Accordingly, the lower surface 82 of the adhesive 80 is defined below the tapered gap 611.

The adhesive 80 located between the hub 33 and the yoke 36 is spread from the third radial gap 73 to the second axial gap 72 at step S2. The radial distance between the projecting portion 334 and the yoke upper plate portion 362 increases with decreasing height from a lower axial end of the third radial gap 73. This arrangement causes a capillary force which attracts the adhesive 80 upward to be generated in the vicinity of a lower axial end portion of the third radial gap 73. As a result, once the viscosity of the adhesive 80 is reduced at step S5, the adhesive 80 located between the hub 33 and the yoke 36 spreads from the third radial gap 73 to the second axial gap 72 and then to the second radial gap 71. In addition, the inner surface 83 of the adhesive 80 is defined in the vicinity of the lower axial end portion of the third radial gap 73.

Meanwhile, the distance between the inner circumferential surface of the hub cylindrical portion 332 and the outer circumferential surface of the yoke cylindrical portion 361 increases with decreasing height from a lower axial end portion of the upper gap 711 of the second radial gap 71. This arrangement causes a capillary force which attracts the adhesive 80 upward to be generated in the vicinity of the lower axial end portion of the upper gap 711 once the adhesive 80 located between the hub 33 and the yoke 36 reaches the lower axial end of the upper gap 711 of the second radial gap 71. Accordingly, the outer surface 84 of the adhesive 80 is defined below the upper gap 711.

Then, if the hub 33, the magnet 35, and the yoke 36 continue to be heated at step S5, the adhesive 80 is cured, so that the magnet 35 and the yoke 36 are fixed to each other, and the hub 33 and the yoke 36 are fixed to each other.

According to the present preferred embodiment, the volume of the increased width portion 612 is greater than the volume of the tapered gap 611. This arrangement enables the amount of the adhesive 80 provided in the increased width portion 612 and the tapered gap 611 immediately after step S4 to be greater than the volume of the tapered gap 611 even if a portion of the adhesive 80 applied to the yoke 36 is removed by the upper surface of the magnet 35 at step S4. This enables the tapered gap 611 to be filled with the adhesive 80 at step S5.

Note that the volume of the increased width portion 612 is preferably greater than the volume of the adhesive 80 located between the magnet 35 and the yoke 36. This arrangement makes it possible to insert the magnet 35 inside the yoke 36 without permitting a portion of the adhesive 80 applied to the yoke 36 to be removed by the upper surface of the magnet 35 at step S4. In this case, the amount of the adhesive 80 provided in the first radial gap 61 is significantly increased to improve the strength with which the magnet 35 and the yoke 36 are fixed to each other.

While preferred embodiments of the present invention have been described above, it is to be understood that the present invention is not limited to the above-described preferred embodiments.

Figure 9:
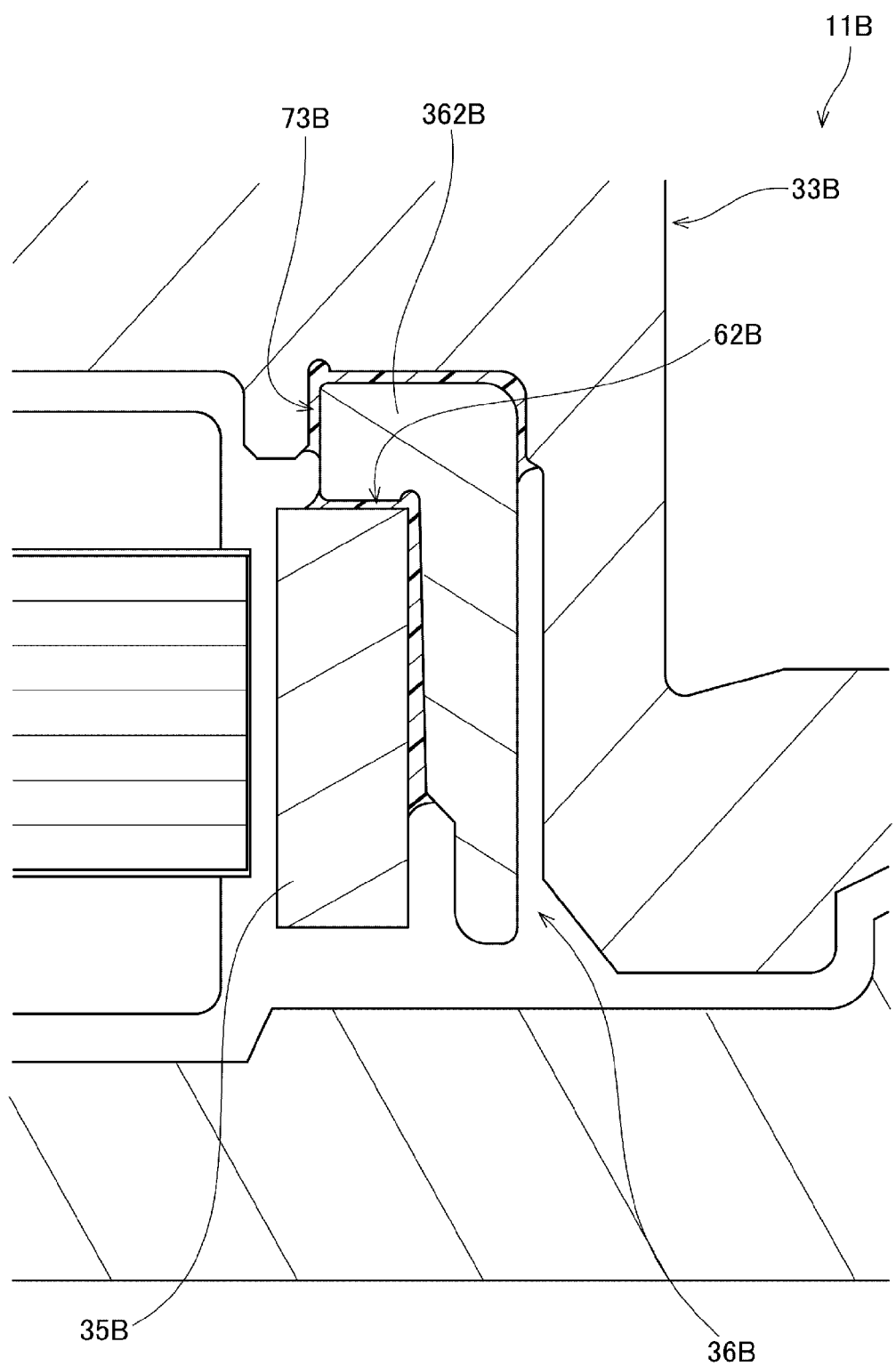
FIG. 9 is a partial vertical cross-sectional view of a motor according to an example modification of the second preferred embodiment of the present invention.

FIG. 9 is a partial vertical cross-sectional view of a motor 11B according to an example modification of the above-described second preferred embodiment. In the modification illustrated in FIG. 9, a yoke 36B preferably does not include the groove portion in a yoke upper plate portion 362B. In this case, a first axial gap 62B has a radial dimension greater than that of the first axial gap 62 according to the above-described second preferred embodiment, and a third radial gap 73B has an axial dimension greater than that of the third radial gap 73 according to the above-described second preferred embodiment. Thus, both strength with which a magnet 35B and the yoke 36B are fixed to each other and strength with which a hub 33B and the yoke 36B are fixed to each other are improved.

Figure 10:
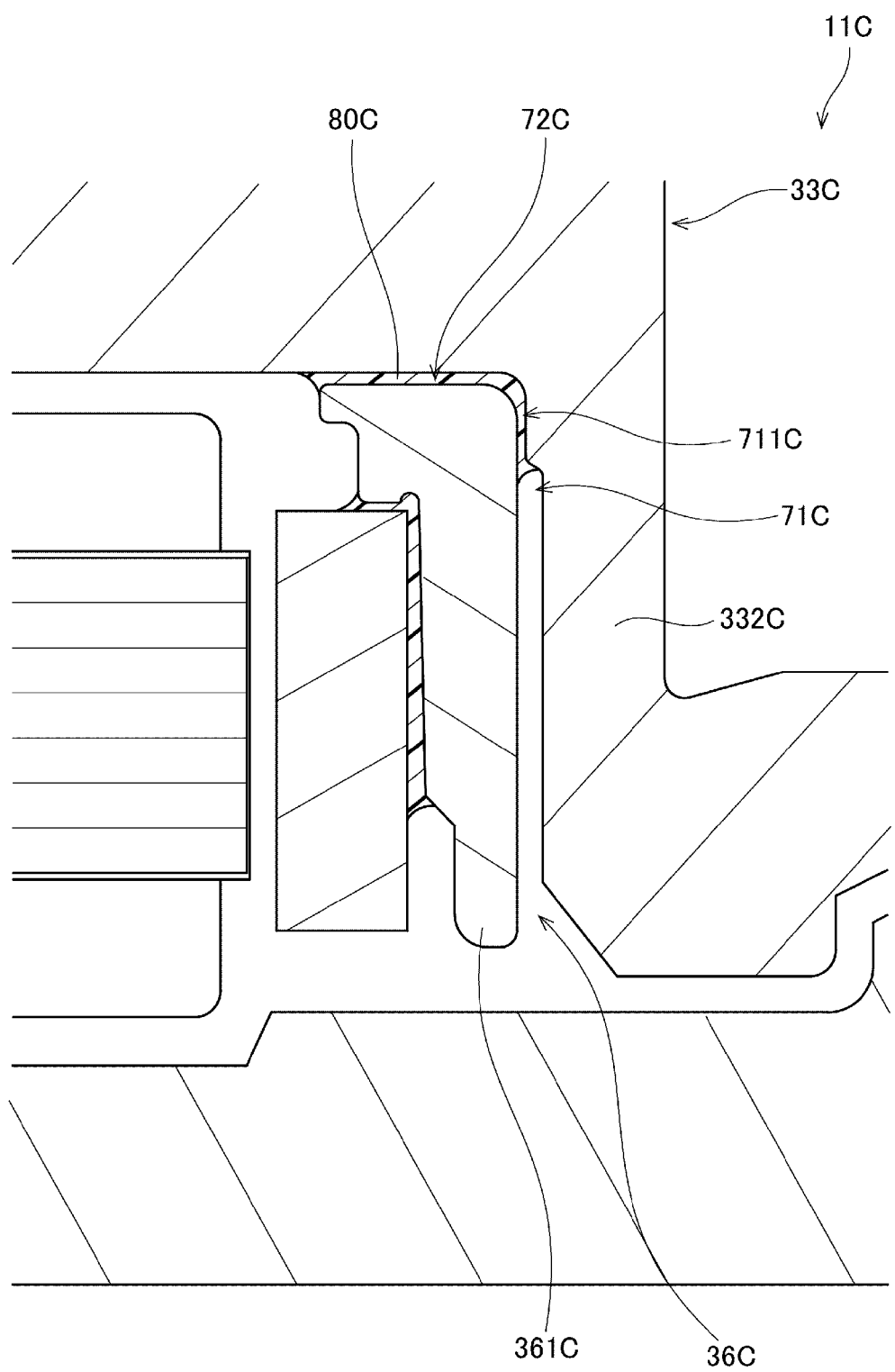
FIG. 10 is a partial vertical cross-sectional view of a motor according to an example modification of the second preferred embodiment of the present invention.

FIG. 10 is a partial cross-sectional view of a motor 11C according to an example modification of the above-described second preferred embodiment. In the modification illustrated in FIG. 10, a hub 33C preferably does not include a projection portion similar to the projecting portion of the above-described preferred embodiments of the present invention. The hub 33C and a yoke 36C may be fixed to each other only through adhesion by an adhesive 80C provided in a second radial gap 71C and a second axial gap 72C. In addition, an outer circumferential surface of a yoke cylindrical portion 361C may be, for example, press fitted to a portion of an inner circumferential surface of a hub cylindrical portion 332C which defines an upper gap 711C of the second radial gap 71C.

Figure 11:
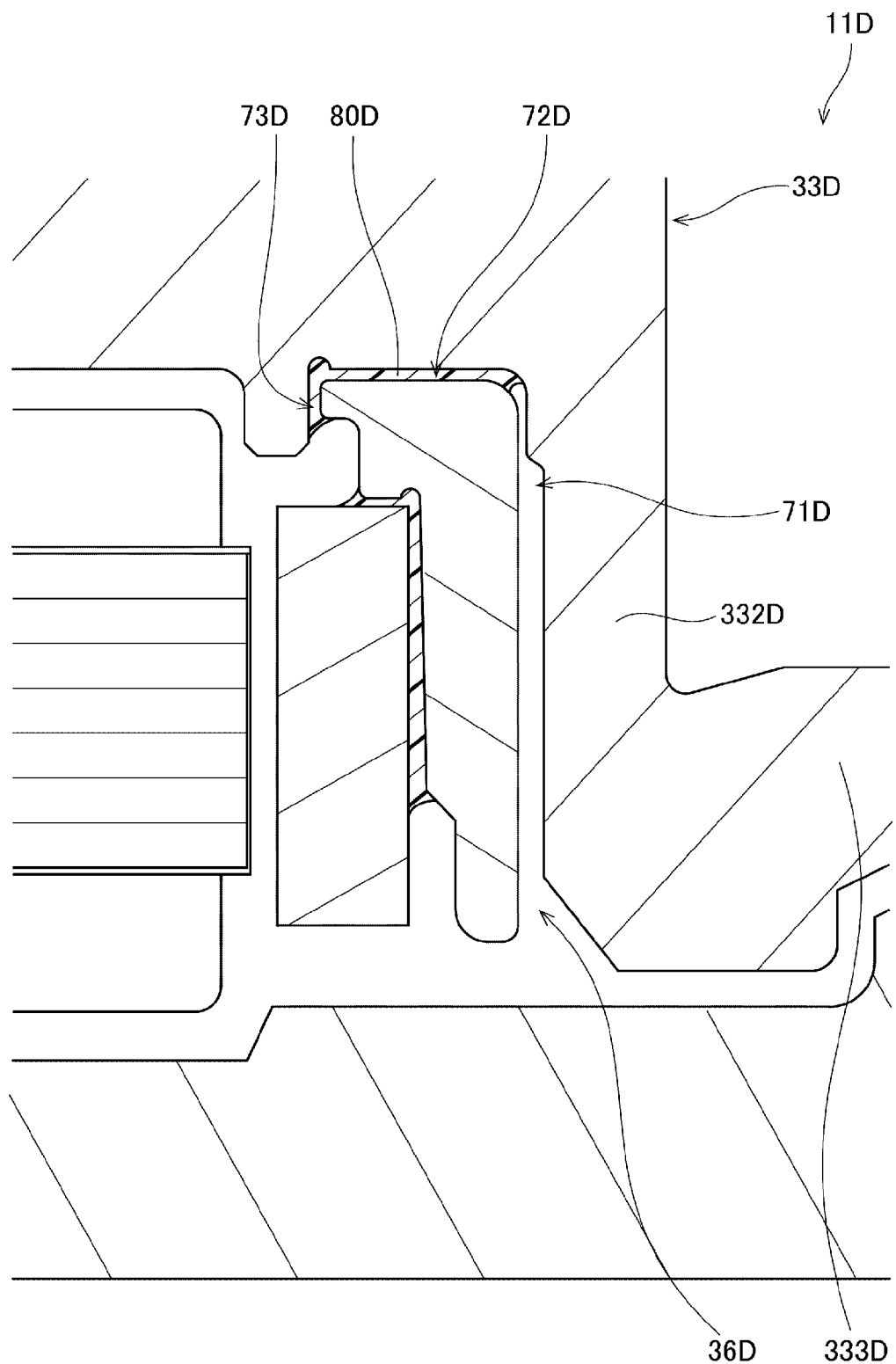
FIG. 11 is a partial vertical cross-sectional view of a motor according to an example modification of the second preferred embodiment of the present invention.

FIG. 11 is a partial cross-sectional view of a motor 11D according to an example modification of the above-described second preferred embodiment. In the modification illustrated in FIG. 11, an adhesive 80D located between a hub 33D and a yoke 36D is preferably provided in both a second axial gap 72D and a third radial gap 73D but not in a second radial gap 71D. There is preferably no adhesive 80D provided in the second radial gap 71D. This arrangement further reduces the likelihood that a deformation of a hub cylindrical portion 332D of the hub 33D will occur due to curing of the adhesive 80D, and in turn further reduces the likelihood of a displacement of a disk mount portion 333D.

Figure 12:
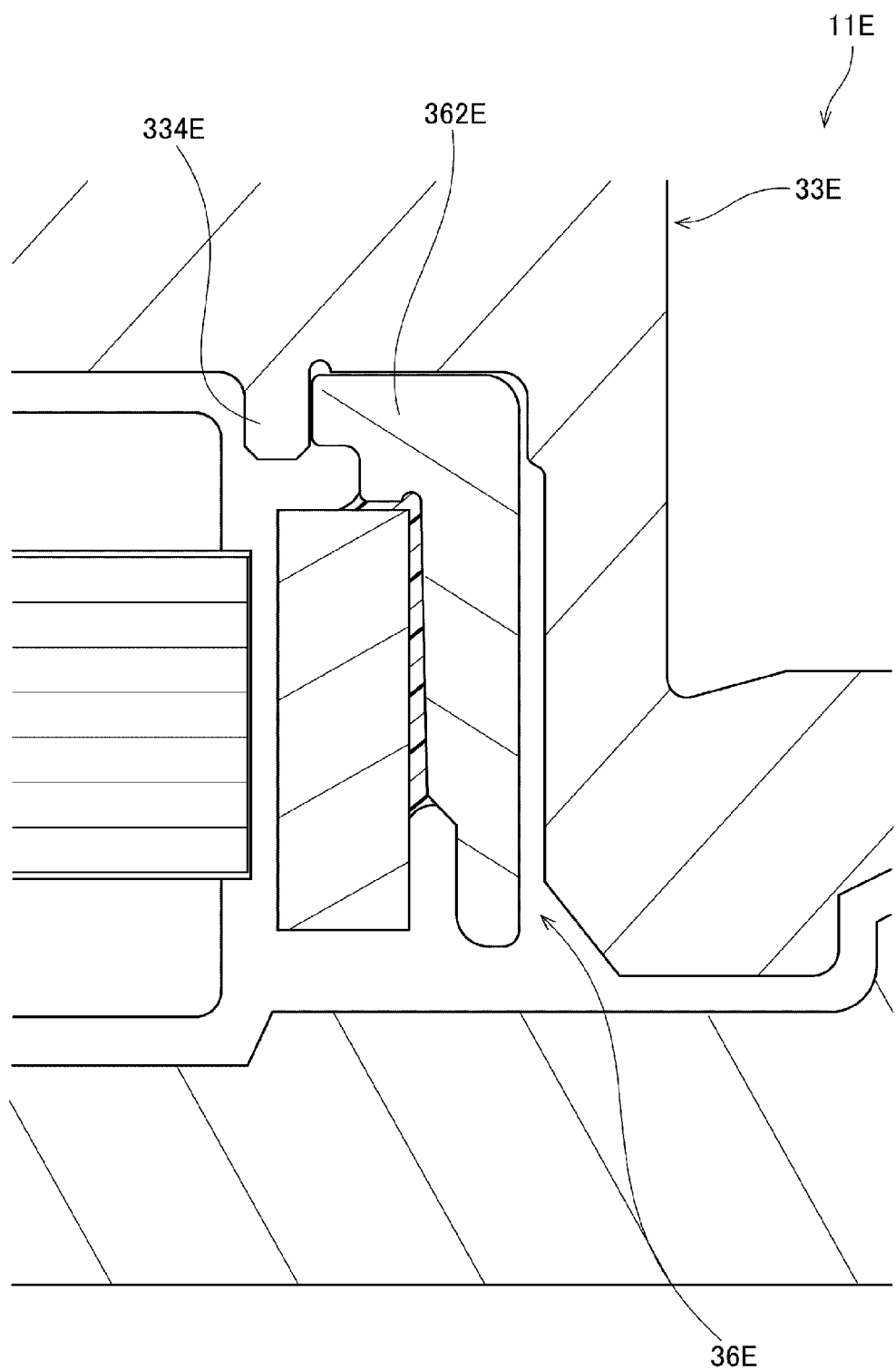
FIG. 12 is a partial vertical cross-sectional view of a motor according to an example modification of the second preferred embodiment of the present invention.

FIG. 12 is a partial cross-sectional view of a motor 11E according to an example modification of the above-described second preferred embodiment. In the modification illustrated in FIG. 12, there is preferably no adhesive located between a hub 33E and a yoke 36E. The hub 33E and the yoke 36E are preferably fixed to each other only through, for example, press fitting between a projecting portion 334E and an inner circumferential surface of a yoke upper plate portion 362E. As long as the press fitting ensures sufficient strength with which the hub 33E and the yoke 36E are fixed to each other, no adhesive may be located between the hub 33E and the yoke 36E as in the modification illustrated in FIG. 12.

According to the above-described second preferred embodiment, the upper axial end of the tapered gap corresponds to the upper axial end of the first radial gap. Note, however, that the upper axial end of the tapered gap may not necessarily correspond to the upper axial end of the first radial gap. For example, the first radial gap may include a portion arranged above the upper axial end of the tapered gap, as long as the upper axial end of the tapered gap is located above the axial middle portion of the first radial gap.

Note that, although the motor according to each of the above-described preferred embodiments preferably is a fixed-shaft motor, a motor according to another preferred embodiment of the present invention may be a rotating-shaft motor. Also note that, although the motor according to each of the above-described preferred embodiments preferably is an outer-rotor motor, a motor according to another preferred embodiment of the present invention may be an inner-rotor motor.

Also note that a motor according to another preferred embodiment of the present invention may be a motor configured to rotate a disk other than a magnetic disk, such as, for example, an optical disk.

Also note that the detailed shape of any member may be different from the shape thereof as illustrated in the accompanying drawings of the present application. Also note that features of the above-described preferred embodiments and the modifications thereof may be combined appropriately as long as no conflict arises.

Preferred embodiments of the present invention and modifications thereto are applicable to motors and disk drive apparatuses.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A motor comprising:
a stationary portion including an armature; and
a rotating portion configured to be rotatable about a central axis extending in a vertical direction; wherein
the rotating portion includes:
   a cylindrical or substantially cylindrical magnet including a pole surface positioned radially opposite to the armature;
   a yoke including a yoke cylindrical portion positioned radially outside of the magnet; and
   a hub including a hub cylindrical portion positioned radially outside of the yoke, and an annular disk mount portion extending radially outward from an outer circumference of the hub cylindrical portion;
a first radial gap has a greater radial width at a lower axial end thereof than at an upper axial end thereof, the first radial gap being a radial gap between an outer circumferential surface of the magnet and an inner circumferential surface of the yoke cylindrical portion;
a second radial gap has a greater radial width at a lower axial end thereof than at an upper axial end thereof, the second radial gap being a radial gap between an outer circumferential surface of the yoke cylindrical portion and an inner circumferential surface of the hub cylindrical portion;
the first radial gap includes a tapered gap gradually increasing in radial width with decreasing height from an upper axial end thereof;
the upper axial end of the tapered gap is located axially above an axial middle portion of the first radial gap;
the first radial gap is filled with an adhesive from at least the upper axial end to the axial middle portion thereof; and
no adhesive is located from at least the lower axial end to an axial middle portion of the second radial gap.

2. The motor according to claim 1, wherein
the first radial gap includes an increased width portion located below the tapered gap; and
the increased width portion has a radial width greater than a maximum radial width of the tapered gap.

3. The motor according to claim 2, wherein the increased width portion has a volume greater than a volume of the tapered gap.

4. The motor according to claim 2, wherein the increased width portion has a volume greater than a volume of the adhesive located between the magnet and the yoke.

5. The motor according to claim 2, wherein a lower surface of the adhesive located between the magnet and the yoke is located in the increased width portion.

6. The motor according to claim 2, wherein a portion of the inner circumferential surface of the yoke cylindrical portion which defines the increased width portion is recessed radially outward relative to a portion of the inner circumferential surface of the yoke cylindrical portion which defines the tapered gap.

7. The motor according to claim 1, wherein
the yoke further includes a yoke upper plate portion extending radially inward from an upper axial end of the yoke cylindrical portion;
a first axial gap includes a radially outer end portion joined to the upper axial end of the first radial gap, the first axial gap being an axial gap between an upper surface of the magnet and a lower surface of the yoke upper plate portion; and
an upper surface of the adhesive located between the magnet and the yoke is positioned above the upper surface of the magnet.

8. The motor according to claim 7, wherein
the hub further includes:
a hub upper plate portion extending radially inward from an upper axial end of the hub cylindrical portion; and
a projecting portion configured to project from a lower surface of the hub upper plate portion to have an annular or substantially annular shape; and
an inner circumferential surface of the yoke upper plate portion and an outer circumferential surface of the projecting portion are fixed to each other.

9. The motor according to claim 1, wherein
the disk mount portion includes a disk mount surface; and
a lower surface of the adhesive located between the magnet and the yoke is located at an axial level lower than an axial level of the disk mount surface of the disk mount portion.

10. The motor according to claim 9, wherein
the adhesive is located in a portion of the second radial gap where the second radial gap has a minimum radial width; and
the minimum radial width of the second radial gap is greater than a minimum radial width of the first radial gap.

11. The motor according to claim 10, wherein
the second radial gap includes:
an upper gap at a top thereof; and
a lower gap joined to the upper gap; and
the lower gap has a maximum radial width greater than a maximum radial width of the upper gap.

12. The motor according to claim 1, wherein
in a gap between the yoke and the hub, at least a portion of the second radial gap in a vicinity of the upper axial end of the second radial gap is filled with the adhesive; and
a lower surface of the adhesive located between the magnet and the yoke is located at an axial level lower than an axial level of a lower surface of the adhesive provided in the second radial gap.

13. The motor according to claim 12, wherein
the adhesive is located in a portion of the second radial gap where the second radial gap has a minimum radial width; and
the minimum radial width of the second radial gap is greater than a minimum radial width of the first radial gap.

14. The motor according to claim 13, wherein
the second radial gap includes:
an upper gap at a top thereof; and
a lower gap joined to the upper gap; and
the lower gap has a maximum radial width greater than a maximum radial width of the upper gap.

15. The motor according to claim 1, wherein
the adhesive is located in a portion of the second radial gap where the second radial gap has a minimum radial width; and
the minimum radial width of the second radial gap is greater than a minimum radial width of the first radial gap.

16. The motor according to claim 1, wherein
the second radial gap includes:
an upper gap located at a top thereof; and
a lower gap joined to the upper gap; and
the lower gap has a maximum radial width greater than a maximum radial width of the upper gap.

17. The motor according to claim 16, wherein the upper gap is filled with the adhesive.

18. A disk drive apparatus comprising:
the motor of claim 1;
an access portion configured to perform at least one of reading and writing of information from or to a disk supported by the hub of the motor; and
a housing configured to accommodate at least a portion of the motor and the access portion.

* * * * *